United States Patent [19]

Borowsky

[11] Patent Number: 4,707,236
[45] Date of Patent: Nov. 17, 1987

[54] METHOD OF FARBRICATING AN OPTICALLY GRADED LIGHT OCCLUDING GEL

[76] Inventor: Richard Borowsky, 17 Amherst Ct., Rockville Center, N.Y. 11570

[21] Appl. No.: 840,345

[22] Filed: Mar. 17, 1986

Related U.S. Application Data

[63] Continuation-in-part of Ser. No. 637,597, Aug. 3, 1984, Pat. No. 4,576,453.

[51] Int. Cl.[4] ............... G02C 7/10; B01D 57/02; B05D 5/06
[52] U.S. Cl. ................. 204/182.8; 204/299 R; 204/180.1; 8/507; 8/444; 351/177; 351/162
[58] Field of Search ............... 204/182.8, 134, 180.2, 204/299 R, 180.1; 8/444, 507; 351/162, 177; 427/162, 164

[56] References Cited

U.S. PATENT DOCUMENTS

| 3,034,403 | 5/1962 | Neefe | 351/162 |
| 4,447,474 | 5/1984 | Neefe | 8/507 X |
| 4,576,453 | 3/1986 | Borowsky | 351/162 |

Primary Examiner—John F. Niebling
Assistant Examiner—John S. Starsiak, Jr.
Attorney, Agent, or Firm—Auslander & Thomas

[57] ABSTRACT

The invention pertains to an electrophoretic technique for fabricating a progressively graded concentration of dye in a hydrophilic polymeric matrix or gel. A charged dye or dye precursor is caused to migrate under the influence of an electrical potential through the gel matrix. An area is formed in the hydrogel matrix which is progressively graded in optical density as a function of the distance from the point of application to the hydrogel matrix. The insertion of the dye through the hydrogel matrix of a contact lens it may be used to form a contact lens with an optically graded central spot.

24 Claims, 6 Drawing Figures

METHOD OF FARBRICATING AN OPTICALLY GRADED LIGHT OCCLUDING GEL

RELATED APPLICATIONS

This application is a continuation in part of the parent application, U.S. Ser. No. 637,597 filed Aug. 3, 1984, now U.S. Pat. No. 4,576,453 Art Unit 257, which is incorporated herein by reference.

FIELD OF THE INVENTION

This invention relates to optically grading a gel or other hydrophilic matrix to light-occlude. The treated gel, among other things, may be used to make contact lenses. More particularly, this invention relates to a method by which such gels can by optically colored electrophoretically.

BACKGROUND OF THE INVENTION

In the aforementioned parent application, a contact lens for light sensitive lens wearers is shown having a progressively optically graded area therein. Such a lens has been found to be useful in screening the light entering the pupil of the eye of the light sensitive wearer, wherein the amount of light falling upon the retina is automatically adjusted.

The gradation in optical density of the lens extends across the lens from a relatively darker central portion to a relatively lighter peripheral portion.

The present invention, among other things, teaches a simple but effective method for fabricating graded light occluding gels generally, using the technique of electrophoresis. An ionized dye is brought into contact with the lens gel material at a central point. An electric potential is applied across the lens gel, causing the dye to migrate from its source, towards the periphery of the lens. Through control of ionic concentrations, and the geometry of the applicator system, this can cause a graded concentration of dye to be disbursed across the lens, i.e., there is a higher concentration of dye at the central point, which concentration progressively diminishes as the distance from the central point.

SUMMARY OF THE INVENTION

The invention features a method of electrophoretically depositing a dye or other coloring agent across a gel to form a progressive optically graded spot. The dye, when used in a gel for contact lenses should be a harmless substance in the event the dye should ever leach from the lens or come in contact with eye tissues. For this purpose, the dye used consists of a finely divided precipitate of native silver or gold. But in order to illustrate the generality of the technique, experiments were performed using food coloring, also. Also to illustrate the generality of the technique, experiments were done with polyacrylamide gels, as well as with formed "soft" (Hydrophilic) contact lenses.

The dye is placed in a medium disposed in a constricted applicator vessel having an orifice that contacts the lens gel at the central point. The medium containing a dye, for instance a food color, as exemplified herein, is divided into a first aqueous solution porously separated from a second salt containing aqueous solution. The first solution contains a higher concentration of the food color dye than the second solution.

An electrical potential is applied between the dye medium and the periphery of the lens gel for an appropriate time sufficient to cause migration of the dye across the lens.

It is an object of this invention to provide an improved method of fabricating a light-occluding gel.

It is another object of the invention to provide a method of fabricating a progressive optically graded area upon a gel using an electrophoretic technique to distribute dye from a central point.

BRIEF DESCRIPTION OF THE INVENTION

Although such novel feature or features believed to be characteristic of the invention are pointed out in the claims, the invention and the manner in which it may be carried out, may be further understood by reference to the description following and the accompanying drawing.

DETAILED DESCRIPTION OF THE INVENTION

Referring now to the figures in greater detail, where like reference numbers denote like parts in the various figures.

Generally speaking, the invention features a gel with a progressive optically graded occluded area which is elctrophoretically prepared. An electrically charged dye is caused to migrate across a gel from a point in the gel under the influence of an electrical potential. The optical density of the lens, i.e., the dye concentration, is greatest at the point and progressively diminishes towards the gel periphery.

Figure 1:
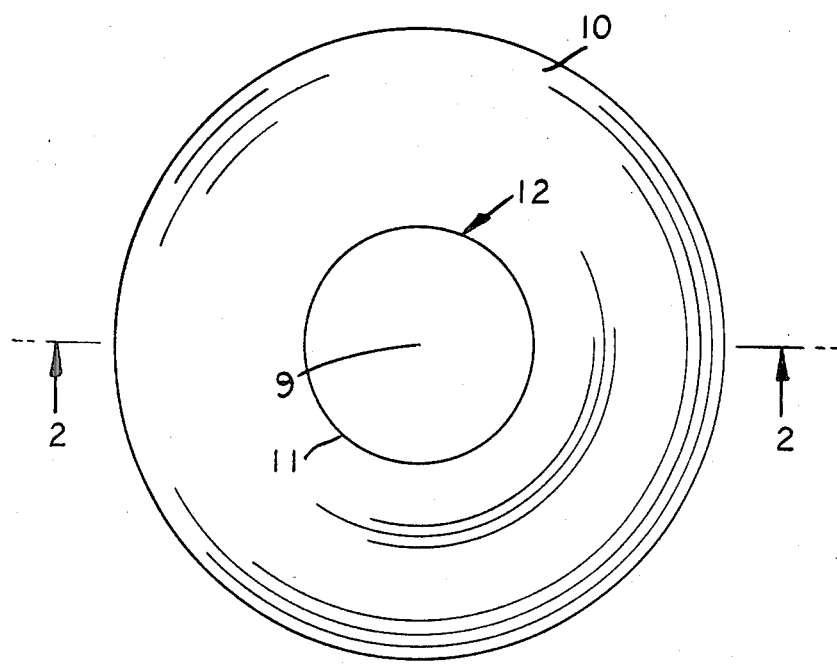
FIG. 1 is a plan view of a light-occluding lens version of this invention.
Figure 2:
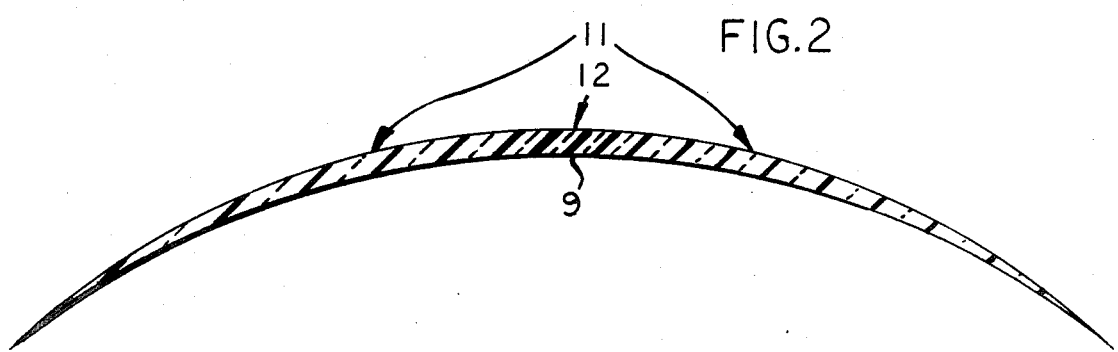
FIG. 2 is a sectional view of the lens of FIG. 1 taken along lines 2—2.

Now referring to FIGS. 1 and 2, the hydrogel matrix blank 10 of this invention is shown having a progressive optically graded area 12 distributed therethrough. The area 12 extends across the water soluble matrix blank 10 from a point 9 to a peripheral point 11. The optical density of the area 12 is greatest at the point 9 and progressively diminishes towards the periphery 11.

Figure 3:
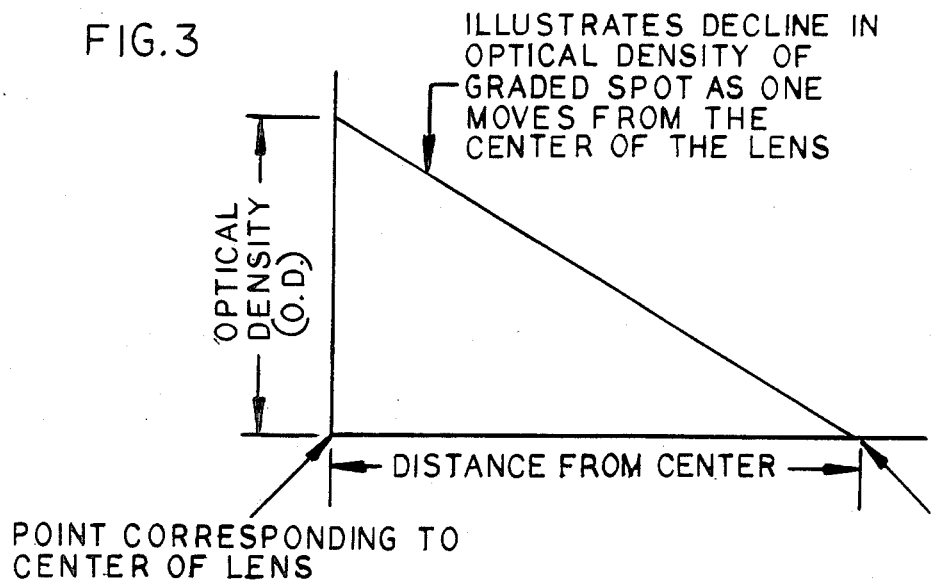
FIG. 3 is a graph illustrating the optical density of the lens shown in FIGS. 1 and 2 with respect to the distance from its center point.

Referring to FIG. 3, the optical density of the area 12, shown in FIGS. 1 and 2, is illustrated in graphical representation with respect to the distance from the point 9 to the periphery 11.

Figure 4:
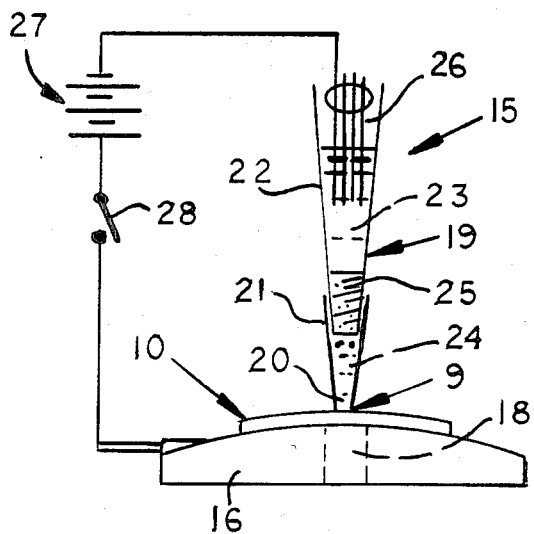
FIG. 4 is schematic view of an apparatus for practicing the method of progressively grading an optical area to the gel depicted in FIGS. 1 and 2.

Now referring to FIG. 4, a typical apparatus 15, in this instance apparatus for producing a contact lens, is schematically illustrated for electrophoretically producing the area 12 on water soluble matrix blank 10, depicted in FIGS. 1 and 2.

The apparatus 15 includes a stage 16 upon which hydrogel matrix blank 10 is disposed. The point 9 of the gel is centered over the center hole 18 in the stage 16. A constricted applicator vessel 19 has its orifice 20 in contact with the point 9 of the water soluble matrix blank 10.

The applicator vessel 19 is comprised of two chambers, a lower chamber 21 and an upper chamber 22.

The upper chamber 22 is filled with a concentrated aqueous dye solution 23.

The lower chamber 21 is filled with a less concentrated aqueous dye solution 24 and additional ionic species. In the experiments using food coloring as dye, the other ions were sodium and chloride. In the application of silver to lenses, the upper chamber is filled with silver nitrate, the lower chamber with sodium nitrate, with or without the addition of silver nitrate. A porous plug 25 separates the upper and lower solutions 23 and 24, respectively.

A cathode 26, which is disposed in the aqueous solution 23, is electrically connected to a source of electrical potential 27, for the experiments with food coloring. For the application of silver, 26 is the anode.

The stage 16 which is comprised of graphite, is connected to the opposite end of the source of potential 27, and becomes the anode (or cathode, as appropriate).

The operation of apparatus 15 is initiated by closing switch 28, which starts the electrophoretic flow of the ionized dye into the hydrogel matrix blank 10. The potential is maintained until a progressive optical graded area 12, as shown in FIGS. 1 and 2, is formed in the hydrogel matrix blank 10; approximately 9 volts for 30 minutes.

The hydrogel matrix blank 10 is then removed from stage 16.

A typical polyacrylamide gel is comprised of the mixture shown in Table I below:

TABLE I

| All chemicals from Biorad, Inc. | |
|---|---|
| Temed (cat #161-0800) | 10 microliters |
| Ammonium persulfate (#161-077) | 25 milligrams |
| Acrylamide/bis 19:1 premix (161-0111) | 10 grams |
| Distilled water | 100 milliliters |

The method described above works better on thicker contact lenses or on lenses with a higher water content than on thinner lenses or those with a lower water content. It is applicable, without modification, to positive dioptric lenses, but negative dioptric lenses tend to be too thin to carry the flow of current necessary to deposit the spot. The technique can be modified to accommodate all lenses, however, by the use of a cast gel button 30 or support for the lens.

Figure 5:
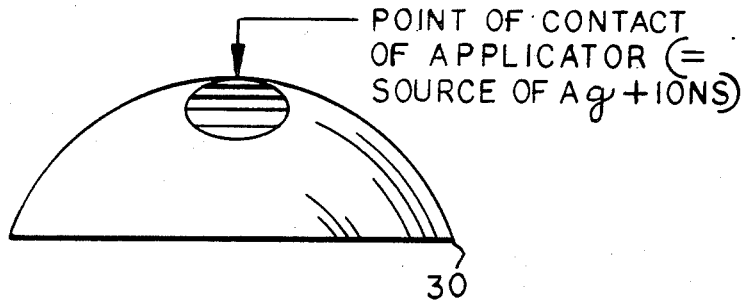
FIG. 5 is a view of the lens illustrating the distribution of the method depicted in FIG. 4.

The button 30 is made of polyacrylamide (12% gel, see Table 1) or of any other hydrophilic matrix, and is cast to have a convex surface that matches the base curve of the lens to be spotted. The supports used were hemispheres (herein, "buttons 30") of polyacrylamide (8, 12 or 16% gel) that had been mixed with various aqueous concentrations of $NaNO_3$ (5%, 10%, 18%, 20% or 30%). The buttons 30 were either covered with Polymacon ® contact lenses or not, and were spotted with silver ions using the double chamber applicator filled with $AgNO_3$ (1%) in both upper and lower chambers. Current was applied from a 27 volt battery for periods of time ranging from 3 to 30 minutes with total fluxes of 1 to 5 Coulombs. The flat surfaces of the buttons 30 were either in full contact with the graphite anode or placed directly over a round hole in the anode so only the circular edge of the button 30 was in contact. At the end of the application, the button 30 was dropped into a NaCl solution which caused the precipitation of AgCl within the button 30 and permitted the visualization of the distribution of Ag within the button. A typical distribution is shown in FIG. 5. The experiments verified theoretical predictions, as follows: (1) When the button's 30 bottom was in full contact with the anode, the deposited spot was more concentrated in its center than towards its edges (a consequence of the geometry of the setup which makes the shortest path for the flow of ions direction through the center of the button 30). (2) For a given current flux, the deposit was smaller and more concentrated, the higher the initial concentration of $NaNO_3$ in the button 30. (3) Placing the button 30 over a hole in the anode caused the increased lateral spread of the deposited spot (because the path of least resistance in the button 30 was from the point of application to the bottom edge, rather than the bottom center.

The results of these experiments were used to modify the support system for efficient application of dye to lenses in two different ways: First, lenses were successfully spotted by placing them on buttons 30 that were put over holes in the anode. Application of current over fifteen minute periods (27 volts, 3 to 5 Coulombs) produced usable deposits on the lenses. When the buttons 30 mixed with high concentrations of $NaNO_3$ were used, the spots were darker than they were when the buttons 30 had been mixed with lower concentrations. It was also determined that permitting the lens to remain in contact with the button 30 for 5 to 10 minutes subsequent to the application of current gave a better deposit in the lens, presumably, from the diffusion of ions from the button's 30 interior towards the surface and into the lens.

As the distribution of silver in the button 30 after ionotophoresis shows that the deposit reaches the top of the button 30 at the point of application, the deposit does not reach the top lateral of the point of application. The deposit is most concentrated in its upper portion. Deposits of silver chloride can be seen after soaking the iontophoresed button 30 in a solution containing Cl-ion.

It was determined experimentally that placing a polyacrylamide cap over the blank 10 on the button 30 (FIG. 6) greatly improved the uniformity and gradation of the deposit in the blank 10. In effect, this modification places the blank 10 within the button 30 and obviates the problem caused by the dye ion's tendency to migrate through the button 30, rather than along its surface.

Figure 6:
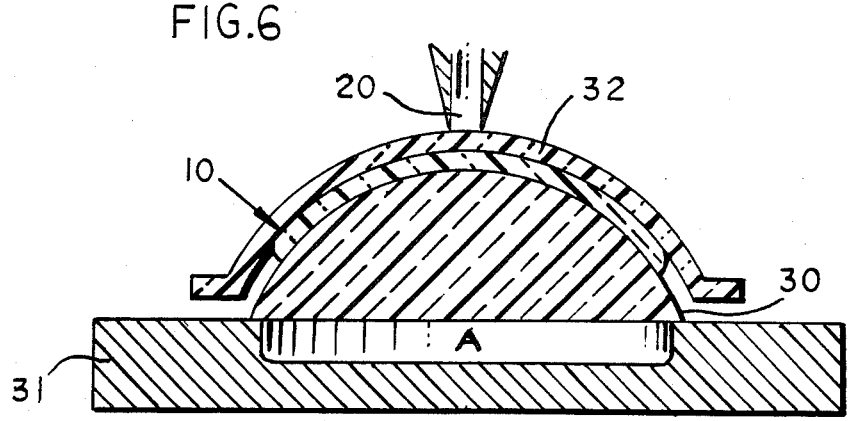
FIG. 6 is a cross-sectional view of a cap, a lens and a button support.

As can be seen in FIG. 6, using a graphite electrode 31 and a button 30, a blank 10 (lens) can be sandwiched between the button 30 and an acrylamide cap 32. The orifice 20 is in contact with the cap 32. The elements, the orifice 20, cap 32, blank 10, button 30 and electrode 31 are in firm contact with each other. The graphite electrode 31 is in contact with the flat bottom of the button 30.

If section A of the graphite electrode 31 is removed, the contact with the button 10 is annular.

Thus, by manipulating ionic concentrations in the double chamber applicator, in the lens, and in the button 30 support, and by varying the geometry of the button 30 support system through its contact with the anode and by making a button-lens-cap sandwich, dye deposits of any size, concentration, and concentration gradient can be achieved within soft contact lenses.

The terms and expressions which are employed are used as terms of description; it is recognized, though, that various modifications are possible.

It is also understood the following claims are intended to cover all of the generic and specific features of the invention herein described, and all statements of the scope of the invention, which, as a matter of language, might fall therebetween.

Having described certain forms of the invention in some detail, what is claimed is:

1. A method of progressively grading an optical area in a hydrogel matrix by electrophoretic introduction of a charged dye into said hydrogel matrix, comprising the steps of:
   (a) contacting a hydrogel matrix with a medium containing an ionized coloring agent, dye, or dye precursor; and
   (b) applying an electrical potential across said hydrogel matrix and said medium for a given period of time, causing said dye to electrophoretically migrate from said medium through said hydrogel matrix, whereby a progessively optically graded area is formed across said hydrogel matrix.

2. The method of claim 1, wherein said coloring agent or dye is selected from a group consisting of: food coloring, an aqueous silver salt and an aqueous gold precursor salt.

3. The method of claim 1, wherein said dye comprises a salt in aqueous solution.

4. The method of claim 1, wherein said hydrogel matrix comprises a buffered acrylamide.

5. The method of claim 1, wherein said medium is placed in a constricted applicator vessel having an orifice that is placed into contact with said hydrogel matrix, wherein upon applying said electrical potential said dye migrates outward through said hydrogel matrix from a point of contact between said orifice and said hydrogel matrix.

6. The method of claim 1, wherein said medium comprises a first dye-containing solution porously separated from a second dye-containing salt solution.

7. The method of claim 6, wherein said first dye-containing solution comprises a higher concentration of dye than said second dye-containing solution.

8. The method of claim 7 wherein said second dye-containing solution also includes an ionic nondye.

9. The method of claim 1, wherein said optical area is a gel.

10. A method of forming a progressively optically graded area within a hydrogel matrix material, comprising the step of electrophoretically migrating an electrically charged coloring agent dye or dye precursor from a point within said hydrogel matrix material to an outer portion of said matrix, whereby a progressively lighter concentration of coloring agent or dye or dye precursor is distributed across said hydrogel matrix material from said point.

11. The method of claim 10, wherein said hydrogel matrix material comprises a polymerizable gel.

12. The method of claim 10, wherein said coloring agent or dye is selected from a group consisting of food coloring, an aqueous silver salt and an aqueous gold salt.

13. The method of claim 10, wherein said optical area is a gel.

14. A method of fabricating a light-occluding lens, comprising the step of electrophoretically migrating a coloring agent or dye or dye precursor within a hydrogel matrix from a point within said hydrogel material, thereby forming a graded area across said hydrogel matrix having a progressively lighter concentration of coloring agent or dye or dye precursor with respect to the distance from said point.

15. The method of claim 13, wherein said hydrogel matrix comprises a polymerizable gel.

16. The method of claim 14, wherein said coloring agent or dye is selected from a group consisting of: food coloring, an aqueous silver salt and an aqueous gold salt.

17. Apparatus for making a progressively graded optical area in a hydrogel matrix by electrophoretic introduction of a charged coloring agent or dye precursor or dye into said hydrogel matrix comprising a stage, said stage adapted to receive a hydrogel matrix blank thereon, a constricted applicator vessel, said vessel including an orifice, said orifice adapted to contact said blank with a medium containing an ionized coloring agent or dye precursor or dye, and a source of electrical potential applied across said medium and said stage for a given period of time, said coloring agent or dye precursor or dye adapted to migrate outward through said hydrogel matrix from a point of contact between said orifice and said hydrogel matrix.

18. The apparatus of claim 17 wherein said applicator vessel comprises two chambers, an upper chamber and a lower chamber.

19. The apparatus of claim 18, wherein said upper chamber includes a cathode disposable in said upper chamber further adapted to be connected to a source of electrical potential.

20. The apparatus of claim 19 wherein said stage is comprised of graphite and connected to the opposite end of the source of said potential function as an anode.

21. The apparatus of claim 17 wherein said upper chamber is adapted to receive a concentrated aqueous dye solution and an ionic nondye and said lower chamber is adapted to receive a less concentrated aqueous dye solution.

22. The apparatus of claim 17 wherein said upper chamber includes a porous plug.

23. The apparatus of claim 17 including a support for said hydrogel matrix.

24. The apparatus of claim 23 including a cap over said hydrogel matrix.

* * * * *